United States Patent Office 3,294,713
Patented Dec. 27, 1966

3,294,713
ORGANIC POLYISOCYANATES AND POLY-
URETHANES PREPARED THEREFROM
George A. Hudson, Kodol, W. Va., and Kenneth A.
Pigott and James H. Saunders, Bridgeville, Pa., as-
signors to Mobay Chemical Company, Pittsburgh, Pa.,
a corporation of Delaware
No Drawing. Filed Dec. 23, 1963, Ser. No. 332,930
12 Claims. (Cl. 260—2.5)

This invention relates to organic polyisocyanates, to polyurethanes prepared therefrom and, more particularly, to polyisocyanates based on polyaryl polyalkylene poly- isocyanates which have improved compatibility with poly- ols and exhibit improved physical properties.

Diphenyl methane diisocyanate has been used hereto- fore to prepare castings, coatings and even cellular poly- urethane plastics. The pure difunctional compound is compatible with all types of polyols including polyhydric polyalkylene ethers and provides products having excel- lent physical properties. Recently, several products which contain a large proportion of diphenyl methane diiso- cyanate and higher homologues of this compound to- gether with the crude byproducts resulting in the phos- genation of the corresponding mixture of amines pre- pared from aniline and formaldehyde have become com- mercially important for castings, coatings and foams. The mixture of diphenyl methane diisocyanate with its higher homologues or the byproducts prepared in the proc- ess of its manufacture are not always uniform and have resulted in considerable problems especially of compati- bility with polyhydric polyalkylene ethers in the produc- tion of polyurethanes. Another problem experienced with these compounds is that they do not always produce uni- form products when reacted with an active hydrogen con- taining compound. Thus, the polyaryl polyalkylene poly- isocyanates, for example those in U.S. Patent 2,683,730 and Canadian Patent 665,495, when combined in approxi- mately stoichiometric quantities with a polypropylene ether prepared by condensing propylene oxide onto glyc- erine or trimethylol propane and then cast into a mold will have inferior physical properties near the top of the molding so that the casting will crumble and rapidly wear away when used as a floor tile, for example, or synthetic concrete.

It has been proposed heretofore to combine polyaryl polyalkylene polyisocyanates with epoxy compounds which contain a plurality of secondary hydroxyl groups in order to improve the mixing characteristics and com- pability of the polyaryl polyalkylene polyisocyanates with various polyols. This method suffers from numerous dis- advantages, particularly the fact that the plurality of hydroxyl groups results in considerable crosslinking of the product so that flexible products cannot be prepared even if they are desired. The addition of an epoxy resin having a plurality of hydroxyl groups is not desirable, be- cause of the resilient crosslinking and would make the production of flexible products very difficult. The use of solvents to realize compatibility is not a good means of producing a compatible system, because it is desirable to keep the systems free from easily volatile materials.

It is therefore an object of this invention to provide poly- aryl polyalkylene polyisocyanates having improved com- patibility with active hydrogen containing compounds for the preparation of polyurethane plastics and resulting in polyurethanes which have improved and uniform physical properties. Still another object of this invention is to provide improved adducts of polyaryl polyalkylene poly- isocyanates. A further object of this invention is to provide polyurethane castings, caulks, sealants, coatings, foams, elastomers and the like based on polyaryl poly- alkylene polyisocyanates. Still another object of this in- vention is to provide an improved method of preparing improved polyurethanes based on polyaryl polyalkylene polyisocyanates. Still another object of this invention is to provide an improved method of preparing polyether polyurethanes which are substantially free of sediment and based on polyaryl polyalkylene polyisocyanates. Still another object of this invention is to provide improved modifying agents and compatibility improvers for poly- aryl polyalkylene polyisocyanates.

The foregoing objects and others which will become apparent from the following description are accomplished in accordance with the invention generally speaking by providing polyaryl polyalkylene polyisocyanates having at least some and less than all of the free —NCO groups thereof reacted with a monofunctional compound contain- ing only one active hydrogen atom as determined by the Zerewitinoff method and polyurethane plastics prepared from the resulting polyisocyanate. Therefore, this in- vention contemplates polyaryl polyalkylene polyisocy- anates which preferably have from about 2 percent to about 50 percent of their —NCO groups reacted with a monofunctional compound having only one active hy- drogen containing atom as determined by the Zerewitinoff method and it is preferred that the monofunctional com- pound have one alcoholic —OH group or one —COOH group as the sole active hydrogen containing group. It is most preferred that the monofunctional compound be a monohydric alcohol which has from 2 to 20 carbon atoms and that it is present in the initial adduct in an amount sufficient to have reacted with from about 2 to about 50 percent of the —NCO groups of said polyaryl polyalkylene polyisocyanate.

A particularly preferred group of adducts within the scope of the present invention are those products which could be represented by the adducts which have 2 to 50 percent and most preferably 5 to 30 percent of the —NCO groups reacted with a monohydric alcohol having 2 to 20 carbon atoms, the initial isocyanate being repre- sented by the formula

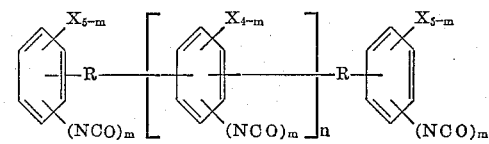

$m = 1-3$,
$n = .5-2.0$,
X = hydrogen, lower alkyl, lower alkoxy, halogen, nitro,
R = alkylene.

It is preferred that the alkylene radicals in said iso- cyanate have from 1 to 6 carbon atoms and R is most preferably methylene, $m$ is most preferably 1 and X is most preferably hydrogen so that the isocyanate can be made by phosgenating the mixture of amines prepared from aniline and formaldehyde. Such products are dis- closed in U.S. Patent 2,683,730 and Canadian Patent 665,495. The invention is not limited, however, to those specific products and $n$ may be any value which corre- sponds to a mixture of di-, tri-, and tetra- or higher poly- isocyanates prepared by the now conventional methods. It is preferred that $n$ is such a value that there are from about 30 to about 60 percent diisocyanates present in the initial mixture of polyaryl polyalkylene polyisocyanates. Desirably, from 40 to 60 percent, most preferably 42 to 48 percent, of the isocyanates are diisocyanates, from 20 to 30 percent are triisocyanates, from 8 to 17 percent are tetraisocyanates and from 5 to 30 percent are penta- and higher polyisocyanates. The starting polyaryl poly- alkylene polyisocyanates are prepared as set forth above by reacting in a first step an aromatic amine with an alde- hyde or ketone.

Any suitable aryl amine preferably having one benzene nucleus and at least one replaceable hydrogen atom is contemplated. It is preferred that the benzene nucleus be substituted by not more than one radical or other substituent, such as, chlorine, bromine, nitro, and the like, and that it have one or two free primary amino groups. When the benzene nucleus is substituted by a radical, it is preferably a lower alkyl radical, such as, methyl, ethyl, propyl and the like. Aniline is the preferred amine. However, other amines are within the scope of the invention including, for example, chloroaniline, bromoaniline, ortho, meta, and paratoluidine, ortho, meta, and para-xylidine, ortho, meta, and para-xenyl amines, methoxy aniline, nitroaniline, 2,4-tolylene diamine, 2,6-tolylene diamine, and the like. These amines demonstrate the radicals X possible in the foregoing formula, i.e., lower alkyl-methyl, etc., lower alkoxy-methoxy, halogen-chloroaniline and the like.

Any suitable aldehyde or ketone may be used and it is preferred that it have less than 7 carbon atoms including, for example, formaldehyde, acetaldehyde, propionaldehyde, butyraldehyde, benzaldehyde, cyclohexanealdehyde, acetone, methyl ethyl ketone, methyl-N-propyl ketone, diethyl ketone, hexanone-2, hexanone-3, di-N-propyl ketone, cyclohexanone and the like. It is preferred that the aldehyde or ketone have the formula RCOR wherein R is hydrogen or alkyl, the sum of the carbon atoms being at most, 6. Where the carbonyl group is removed from the aldehyde or ketone, these demonstrate the radicals, R in the foregoing formula such as methylene from formaldehyde and so forth.

Any suitable catalyst for the condensation of said amine with said aldehyde may be used, but it is preferred to use a strong Lewis acid including, for example, hydrochloric acid, sulfuric acid, perchloric acid, hydrobromic acid, borontrifluoride, tin tetrachloride, phosphorous trichloride, phosphorous oxychloride, thionyl chloride, aluminum trichloride, iodine, bromine, benzoyl chloride, phthalyl chloride, benzyl chloride and the like.

The ratio of amine to aldehyde or ketone in the reaction process is important. In order to avoid high polymers, it is necessary to have more than one mol of amine per mol of aldehyde, and it is preferred that the molar ratio of amine to aldehyde be within the range of from about 1.4:1 to about 4:1. Stated in other words, and with particular reference to the preferred aniline-formaldehyde reaction, one should preferably not have less than a 30 percent molar deficiency of aniline, and there is no real advantage to having more than a 100 percent molar excess of aniline. A preferred aniline to formaldehyde ratio is from about 1.6 mols of aniline per mol of formaldehyde to about 3.2 mols of aniline per mol of formaldehyde. While excesses above 100 percent may be used, they are uneconomical and anything above 300 percent molar excess is very uneconomical because of the problem of separating the excess amine from the desired product. When molar deficiencies or molar excesses are referred to, it is understood that an equivalent amount herein is two mols of aniline or other monoaryl amine per mol of formaldehyde or other aldehyde or ketone, since two mols of aniline will theoretically react with one mol of formaldehyde to yield one mol of diamino diphenyl methane or the like.

Since the amine-aldehyde or amine-ketone reaction is preferably carried out in aqueous solution, it is desirable to control the weight ratio of aniline to water. A satisfactory aniline to water ratio is from about 0.2:1 to about 30:1 and it is preferred to hold the ratio within the range of from about 0.5:1 to about 6:1. Below about 0.2:1, aniline becomes dissolved in the water and is lost. Furthermore, a problem of separation exists since aniline is just slightly heavier than water and, thus, with large excesses of water, the brine formed in the neutralization step is more likely to have the same specific gravity as aniline. When the specific gravities are the same or nearly the same, the separation becomes difficult. Ratios above about 30 parts of aniline per part of water make handling of the aniline impractical.

For some products, it is desirable to make a crude reaction product of amines which has from about 40 percent to about 95 percent diamine. By suitable adjustment of the ratios of components and the amount of water, it is possible to produce any desired ratio of diamine to higher polyamines.

The reaction may be carried out at any suitable temperature. It is preferred to have the reactants warm enough so they will flow easily, but below the boiling point at the operating pressure. It is to be pointed out that the reaction may be carried out under pressure. At low pressures, it is preferred to add the aldehyde or ketone and preferably formaldehyde at ambient temperatures and the aqueous solution of aniline mixed with aniline hydrochloride or other salt at a temperature of about 45° C. to about 65° C. The reaction is exothermic. In some cases, therefore, it may be necessary to cool the reaction mixture, but in most cases, the reactants can be allowed to exotherm without cooling.

The organic polyisocyanates are then prepared by reacting phosgene with the resulting mixture of amines preferably at a temperature of from −10° C. to about 80° C. in a first step to prepare a mixture of carbamyl chlorides and amine hydrochlorides and then at a higher temperature and with additional phosgene in a second step to prepare the corresponding isocyanates. The phosgenation is preferably carried out in an inert organic solvent such as orthodichlorobenzene, toluene, the diethyl ether of diethylene glycol or any other suitable solvent for example, those disclosed in U.S. Patent 2,683,730. The phosgenation procedure of this patent is also satisfactory. Solvent is removed from the crude mixture and then it is reacted with a monofunctional compound as set forth below.

Any suitable monofunctional compound may be used for reaction with the polyaryl polyalkylene polyisocyanate provided that it has only one active hydrogen containing atom as determined by the Zerewitinoff method. It is preferred to use either monocarboxylic acids or monohydric alcohols and the latter are most preferred. Monocarboxylic acids which may be used include, for example, oleic acid, lauric acid, linoleic acid, linolenic acid, propionic acid, and the like.

Monohydric alcohols such as the following primary or secondary alcohols which may be used are preferably those having 2 to 20 carbon atoms including for example, ethanol, propanol, butanol, amyl alcohol, hexanol, heptanol, octanol, nonanol, decanol, undecanol, dodecanol, tridecanol, tetradecanol, pentadecanol, hexadecanol, octadecanol, nondecanol, eicosanol as well as furfuryl alcohol, benzyl alcohol, cyclohexanol and the like. It is also possible and in some cases desirable, to use ethers, esters and the like of these alcohols. For example, one may use the alkylene oxide adducts of these monofunctional compounds such as, for example, the reaction product of several mols of ethylene oxide or propylene oxide with acetic acid or ethanol, propanol or any of the other alcohols set forth above. A particularly suitable compound, for example, is the monomethyl ether of ethylene glycol or the monoethyl ester of adipic acid. The ethers are particularly preferred including for example, the ethyl, butyl, propyl, amyl or the like ether of ethylene glycol, propylene glycol, butylene glycol, diethylene glycol or the like. If the acids are used, one must suffer the disadvantages of $CO_2$ evolution, but it is preferred to use only the alcohols and those which have long chain ethers or esters are most preferred, for example, the lauric acid ester of ethylene glycol and the like.

The initial adducts of the polyaryl polyalkylene polyisocyanates are prepared by simply combining the isocyanate with the monofunctional compound and where acid is used it is preferred to carry out the addition with vigorous stirring and a partial vacuum in order to remove $CO_2$ which can become entrapped in the reaction mixture. It is possible to add the isocyanate to the alcohol but this is not preferred. It is additionally possible where polyaryl polyalkylene polyisocyanates are to be used to prepare polyurethane plastics to simultaneously react the polyisocyanate with the monofunctional compound and an organic compound containing a plurality of active hydrogen containing groups as determined by the Zerewitinoff method. This method is not preferred since it is best to prereact a portion of the —NCO groups of the polyaryl polyalkylene polyisocyanate in order to obtain the maximum improvement in compatibility with polyols and in the physical properties of the resulting polyurethane product.

Therefore, the adducts of the polyaryl polyalkylene polyisocyanates and the monofunctional compound may be used to prepare polyurethane plastics by reacting the adduct either alone or in admixture with other compounds including additional organic polyisocyanates with an organic compound containing active hydrogen containing groups as determined by the Zerewitinoff method to prepare a polyurethane plastic. Both porous and nonporous polyurethane plastics may be prepared. The invention is particularly applicable to the preparation of solventless or so-called 100 percent solids type of polyurethane plastic.

In the latter type of process, the adduct of the polyaryl polyalkylene polyisocyanate and the monofunctional compound is combined with an organic compound containing active hydrogen containing groups as determined by the Zerewitinoff method in any suitable manner and applied to the surface or into the mold where it is allowed to cure. For example, the adduct and the active hydrogen containing compound may be mixed by injecting them through the nozzles of a conventional paint spray apparatus onto a wall or other substrate where they react to form a coating. Alternately, the components may be mixed and placed in a simple extruder such as a caulking gun and extruded into cavities or cracks, for example around the windows in a dwelling, in order to be used as a caulk. Still further, the components would be mixed in a bucket and applied with a putty knife. While the 100 percent solids system is the most useful for the adducts of the present invention, they may be used to prepare any other type of polyurethane plastic. For this purpose, including the caulks and sealants referred to above, one may use any suitable active hydrogen containing compound containing at least two active hydrogen containing groups as determnied by the Zerewitinoff method. Generally speaking, any compound having an active hydrogen atom as defiined above which will react with an —NCO group may be used. Hydroxyl groups react with —NCO groups to yield urethane groups whereas carboxylic acids yield amide groups and amines yield ureas. The alcoholic group is strongly preferred because it is readily available and yields a stronger urethane linkage than a phenolic type hydroxyl group. Moreover, to prepare polyurethane plastics, it is preferred to have an organic compound of the type specified above which contains a plurality of active hydrogen containing groups and preferably at least some alcoholic hydroxyl groups. It is to be understood that when the above terminology is used, active hydrogen containing compounds are contemplated which may contain any of the following types of active hydrogen containing groups, among others, —OH, —NH$_2$, —NH, —COOH, —SH and the like. Examples of suitable types of organic compounds containing at least two active hydrogen containing groups which are reactive with an isocyanate group are hydroxyl polyesters, polyhydric polyalkylene ethers, polyhydride polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation may vary so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,5-pentane diol, 1,2-propylene glycol, 1,4-butylene glycol, 1,3-butylene glycol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide beginning with any suitable initiator. The initiator may be difunctional compound including water so that the resulting polyether is essentially a chain of repeating alkylene oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having to to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Patents 1,922,459; 3,009,939 and 3,061,625 or by the process disclosed by Wurtz in 1859 and in Encyclopedia of Chemical Technology, volume 7, pages 257 to 262, published by Interscience Publishers, Inc. (1951.)

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p''-triphenylmethane triamine, ethylene diamine, propylene diamine, propylene triamine, N,N,N',N'-tetrakis-(2-hydroxypropyl) ethylene diamine, diethylene triamine and the like. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use of the preparation of the hydroxyl polyesters.

Any suitable aliphatic polyol may be used such as, for example, alkane diols such as, for example, ethylene glycol, 1,3-propylene glycol, 1,2-propylene glycol, 1,4-butane diol, 1,3-butylene glycol, 1,5-pentane diol, 1,3-pentane diol, 1,6-hexane diol, 1,7-heptane diol, 2,2-dimethyl-1,3-propane diol, 1,8-octane diol and the like; including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propanel dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example aromatic polyamines such as, for example, p-amino aniline, 1,5-diamine naphthalene, 2,4-diamino toluylene, 1,3,5-benzene triamine, 1,2,3-benzene triamine, 1,4,5,8-naphthalene tetraamine and the like; aliphatic polyamines such as, for example, ethylene diamine, 1,3-propylene diamine, 1,4-butylene diamine, 1,3-butylene diamine, diethyl triamine, triethylene tetraamine, 1,3,6-hexane triamine, 1,3,5,7-heptane tetraamine and the like; heterocyclic polyamines such as, for example, 2,6-diamino pyridene, 2,4-diamino-5-aminomethyl pyrimidine, 2,5-diamino-1,3,4-thiadiazol and the like.

Phosphorous containing compounds are often advantageously used because of the flame retarding effect which they impart to the resulting plastics. These compounds often contain 1 or 2 phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advantageous to use mixtures of phosphorus pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantageously prepared in accordance with the method of U.S. Patent 3,009,929 where triphenyl phosphite, for example, is reacted with a polypropylene ether glycol to prepare a product having a molecular weight of about 500. Other processes are disclosed in the patent. It is also possible to use polyethers based on phosphorous which contain nitrogen atoms in addition to the phosphorous atoms. These compounds may be represented by the general formula

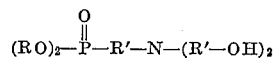

wherein R is lower alkyl or phenyl, for example, methyl, ethyl, propyl, butyl and the like and R' is alkylene, preferably having from 1 to 4 carbon atoms such as, methylene, ethylene, 1,2-propylene, 1,4-butylene and the like. A preferred compound is dioxyethylene-N,N-bis-(2-hydroxyethyl) aminomethyl phosphonate.

Any of the compounds of any of the classes set forth above may be substituted with halogen such as, for example, chloro, bromo, iodo and the like; nitro; alkoxy, such as, for example, methoxy, ethoxy, propoxy, butoxy and the like; carboalkoxy such as, for example, carbomethoxy, carbethoxy and the like; dialkyl amino such as, for example dimethyl amino, dipropyl amino, methylethyl amino and the like; mercapto, carbonyl, thiocarbonyl, phosphoryl, phosphato and the like.

Any other suitable isocyanate may be mixed with the adducts of the present invention, preferably at least 50 perecnt of the total isocyanates used is the adduct of the present invention. Suitable organic polyisocyanates are, therefore, ethylene diisocyanate,
ethylidene diisocyanate,
propylene-1,2-diisocyanate,
cyclohexylene-1,2-diisocyanate,
m-phenylene diisocyanate,
2,4-tolylene diisocyanate,
2,6-tolylene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate, 3,3'-dichloro-4,4'-biphenylene diisocyanate,
p,p',p''-triphenylmethane triisocyanate,
1,5-naphthalene diisocyanate,
furfurylidene diisocyanate or polyisocyanates in a blocked or inactive form such as bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

The polyisocyanates of the invention are useful for the preparation of cellular polyurethane plastics by reaction thereof with an active hydrogen containing compound in the presence of a blowing agent. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free —NCO groups which is then reacted in a second step with water to prepare a foam. Alternately, the components may be reacted in a single step. Furthermore, instead of water, low boiling hydrocarbons such as pentane, hexane, heptane, pentene, heptene and the like; azo compounds such as azohexahydrobenzodinitrile and the like, halogenated hydrocarbons such as dichlorodifluoroethane, dichlorodifluoromethane, trichlorofluoromethane, vinylidene chloride, methylene chloride and the like may be used as blowing agents. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

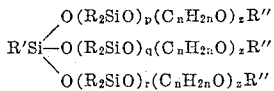

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

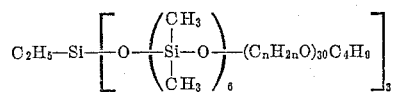

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,537, 668,478 and 670,091. Other suitable compounds may therefore have the formula $$(R')(SiO_3)_x(R_2SiO)_y[(C_nH_{2n}O)_zH]_a[R''']_{3x-a}$$

where $x$ is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that such compositions of matter are mixtures of such block copolymers wherein $y$ and $z$ are of different values and that method of determining the chain length of the polysiloxane chains and the polyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $R_3Si—$ where R is monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

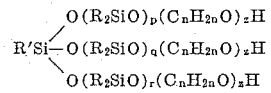

where $p+q+r$ has a minimum value of 3, the other subscripts being the same as in the immediately foregoing formula. In this instance, all three of the oxyalkylene chains are joined to the end of polysiloxane chains of the type —$(R_2SiO)$—. Specifically, one could use

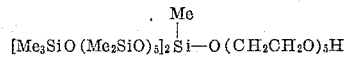

Any suitable catalyst may be used to speed up the reaction if desired such as, for example, dimethyl benzyl amine, dimethyl stearyl amine, permethylated diethylene triamine, N-methyl-N'-dimethylaminoethyl piperazine, N,N'-endoethylene piperazine, N-alkyl morpholines; tertiary aminoethers such as, for example, 1-alkoxy-3-dialkylaminopropane, tertiary amines with ester groups, salts of tertiary amines, especially with organic acids such as, for example, oleic acid, benzoic acid, and the like; dibutyl tin dilaurate, dibutyl tin di-2-ethyl hexoate, dibutyl-tin-bis-(dimethylamino caproate), stannous octoate, stannous oleate, lead naphthenate, ferric acetylacetonate, mixtures thereof and any other catalyst which will promote the reaction between isocyanate groups and active hydrogen atoms as determined by the Zerewitinoff method as those disclosed in "Catalysis of the Isocyanate-Hydroxyl Reaction," by J. W. Britain and P. G. Gemeinhardt, Journal of Applied Polymer Science, volume IV, Issue No. 11, pages 207–211 (1960).

The polyisocyanates of the invention may also be used for the production of coating compositions. In this case, the organic compound containing active hydrogen containing groups is reacted with the polyisocyanates of the invention in an inert organic solvent therefor, such as, for example, ethyl acetate, methyl formamide, the diethyl ether of diethylene glycol, benzene, xylene, benzine and the like.

Castings which are elastomeric in nature or which are rigid like concrete may be prepared in accordance with the invention by mixing them with an organic compound containing active hydrogen containing groups and according to the functionality of the compound preparing either flexible or rigid typecastings. For flexible materials a di-or trifunctional relatively high molecular weight polyol is preferred such as, for example, a polyester or polyether having a molecular weight of from about 1,000 to about 3,000 and an hydroxyl number of from about 30 to about 75. For rigid materials, lower molecular weight polyols are preferred, preferably those having an hydroxyl number above about 100 and preferably between about 200 and about 300. The adducts are combined with the polyol or other active hydrogen containing compound with rapid mixing and poured into a mold. It is seldom necessary to use any additional chain extending agent such as 1,4-butanediol, 1,3-butanediol, propylene glycol, the bis-beta-hydroxy ethyl ether of hydroquinone or the like, but such chain extending compounds can be used if necessary or desirable.

The products of the invention are useful where polyurethanes have been used heretofore and particularly for the preparation of sealants, flooring, coatings for walls, chemically resistant coatings for floors, foams which may be used for insulation or for packaging or the like.

The invention is further illustrated by the following examples in which parts are by weight unless otherwise indicated.

*Example 1*

About 140 parts of a mixture of polyaryl polyalkylene polyisocyanates obtained by phosgenating the reaction product of aniline with formaldehyde, said mixture of organic polyisocyanates having the formula

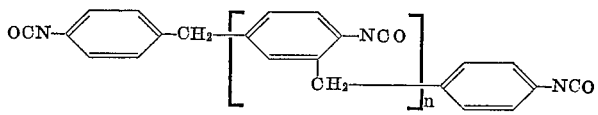

wherein $n$ has an average value of 0.88 and contains about 50 percent diisocyanate and about 21 percent triisocyanate, the balance being tetra- and pentaisocyanates sufficient to give $n$ a value of 0.88, having an equivalent weight of about 140 are stirred and about 30 parts of ethylene glycol monomethyl ether are gradually added thereto. After addition is completed, the stirring is stopped and the reaction product is allowed to stand over night at room temperature in a glass beaker. The equivalent weight of the reaction product is about 254 indicating that about 33 percent of the —NCO in the initial polyaryl polyalkylene polyisocyanates has been reacted. The reaction product is then mixed with an adduct of trimethylol propane and propylene oxide which has a molecular weight of about 740 at an —NCO:OH ratio of about 1:1. The resulting mixture is poured into a mold and after it has cured to a clear hard casting there is no precipitate or solids formation and the product has a uniform cure and appearance throughout. When an identical but unmodified polyaryl polyalkylene polyisocyanate is combined with the trimethylol propane propylene oxide adduct oil-like specks are noted. At the bottom of the casting a dark-colored material settles out. This dark-colored material does not cure but remains soft and gummy. In comparison with the casting made from the modified polyisocyanate, the casting made from the unmodified polyisocyanate is softer and shows a non-uniform cure throughout the length of the casting.

*Example 2*

About 254 parts of the adduct prepared in Example 1 from ethylene glycol monomethyl ether and the polyaryl polyalkylene polyisocyanate is mixed with about 170 parts of a polyester having an hydroxyl number of about 52 and prepared from diethylene glycol, glycerine and adipic acid, about 650 parts of $TiO_2$, about 12 parts of carbon black, about 1.4 parts of dibutyl tin dilaurate and about 20 parts of a synthetic alumino silicate having a pore size of about 4 angstroms. The resulting mixture is cast onto a mold where it cures to a soft flexible gray coating which will not break when bent double. An identical casting prepared without first modifying the polyaryl polyalkylene polyisocyanate with ethylene glycol monomethyl ether has low tensile strength and very poor flexibility; when a ¼ inch section is bent double it will crack and break away from itself.

*Example 3*

About 165 parts of the polyaryl polyalkylene polyisocyanate of Example 1 are mixed with about 10 parts of each of the alcohols specified in the following table to produce a product having the equivalent weight and the percent of its —NCO reacted which is indicated in the table.

| | Equivalent Weight | Percent —NCO Reacted |
|---|---|---|
| Amyl alcohol | 163 | 9.6 |
| Ricinoleyl alcohol | 153 | 2.9 |
| N-decanol | 156 | 5.3 |
| Lauryl alcohol | 155 | 4.5 |
| Isooctyl alcohol | 159 | 6.5 |

An amount in parts corresponding to the equivalent weight of each of these products is separately combined with about 240 parts of an adduct of trimethylol propane and propylene oxide having a molecular weight of about 740. In each case where the adduct is used, a casting is obtained which is rigid and uniform throughout with no initial phase separation or incompatibility of the adduct with the polyhydric polyalkylene ether. On the contrary, when the polyaryl polyalkylene polyisocyanate is not prereacted with an alcohol, sediment forms in the bottom of the mold where the products are cast and a nonuniform product which is weak at the top and gummy on the bottom of the mold is formed.

*Example 4*

About 140 parts of the polyaryl polyalkylene polyisocyanate of Example 1 are mixed with about 87 parts of a mixture of 80 percent 2,4- and 20 percent 2,6-toluylene diisocyanate and then reacted simultaneously with about 1170 parts of the polyester of Example 2, about 186 parts of lauryl alcohol, about 1356 parts of $SiO_2$ and about 14 parts of dibutyl tin dilaurate and cast into a mold. The mixture forms a soft, flexible material having good toughness.

*Example 5*

About 120 parts of an adduct prepared by reacting about 10 parts of lauryl alcohol with about 165 parts of the polyaryl polyalkylene polyisocyanate of Example 1 are mixed with about 100 parts of a propylene oxide adduct of alpha-methyl-d-glucoside having an hydroxyl number of about 430, about 30 parts of trichlorofluoromethane, about 20 parts of a silicone oil having the formula

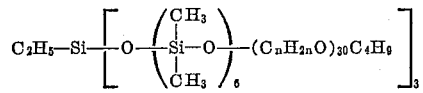

wherein $(C_nH_{2n}O)$ is a mixed polyoxyethylene and oxypropylene block copolymer containing about 17 oxyethylene units and about 13 oxypropylene units, and about 2 parts of 1-methyl-4-dimethyl amino ethyl piperazine by stirring rapidly and then the mixed components are poured into a mold where they cream and foam in a short time to produce a rigid foam plastic having good physical properties and a density of about 2 lbs./ft.$^3$.

It is to be understood that the foregoing working examples are given for the purpose of illustration and that any other suitable polyaryl polyalkylene polyisocyanate, monofunctional organic compound having active hydrogen containing groups as determined by the Zerewitinoff method, catalyst, stabilizer, or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyisocyanate prepared by a process which comprises reacting a mixture of different polyaryl polyalkylene polyisocyanates having the formula

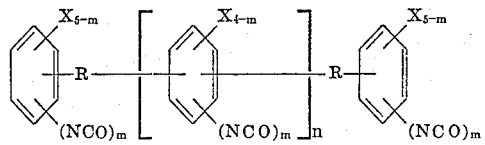

wherein $m$ is 1 to 3, $n$ is from about 0.5 to about 2.0, X is selected from the group consisting of hydrogen, lower alkyl, lower alkoxy, and halogen and R is an alkylene radical having from 1 to 6 carbon atoms, with sufficient primary or secondary monohydric alcohol having from 2 to 20 carbon atoms to react with from about 2 to about 50 percent of the —NCO groups of said compound.

2. The composition of claim 1 wherein from about 5 to 30 percent of the —NCO groups of said polyaryl polyalkylene polyisocyanate are prereacted with said monohydric alcohol.

3. A polyisocyanate prepared by a process which comprises reacting a mixture of different polyaryl polyalkylene polyisocyanates having the formula

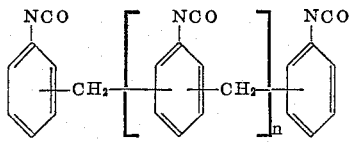

wherein $n$ is from about 0.5 to about 2.0, with sufficient amyl alcohol to react with from about 2 percent to about 50 percent of the —NCO groups of said mixture of polyaryl polyalkylene polyisocyanates.

4. A polyisocyanate prepared by a process which comprises reacting a mixture of different polyaryl polyalkylene polyisocyanates having a formula

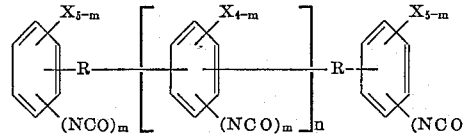

wherein $m$ is 1 to 3, $n$ is from about 0.5 to about 2.0, X is selected from the group consisting of hydrogen, lower alkyl, lower alkoxy and halogen and R is an alkylene radical having from 1 to 6 carbon atoms, with sufficient primary or secondary monohydric alcohol or monocarboxylic acid to react with from about 2 to about 50% of the —NCO groups of said mixture of polyaryl polyalkylene polyisocyanates.

5. The polyisocyanate of claim 4 wherein $m$ is 1, $n$ is 0.7, X is hydrogen, R is methylene and a primary monohydric alcohol having 2 to 20 carbon atoms is reacted with said mixture of polyaryl polyalkylene polyisocyanates.

6. A polyurethane plastic prepared by a process which comprises reacting an organic compound containing at least two active hydrogen containing groups as determined by the Zerewithinoff method with a polyisocyanate prepared by a process which comprises reacting a mixture of different polyaryl polyalkylene polyisocyanates having the formula

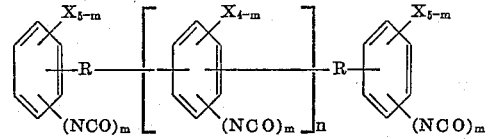

wherein $m$ is 1 to 3, $n$ is from about 0.5 to about 2.0, X is selected from the group consisting of hydrogen, lower alkyl, lower alkoxy, and halogen and R is an alkylene radical having from 1 to 6 carbon atoms, with sufficient primary or secondary monohydric alcohol or monocarboxylic acid to react with from about 2 to about 50% of the —NCO groups of said mixture of polyaryl polyalkylene polyisocyanates.

7. The polyurethane plastic of claim 6 wherein said organic compound containing active hydrogen containing groups is a polyhydric polyalkylene ether.

8. The polyurethane plastic of claim 6 wherein a blowing agent is included to prepare a cellular polyurethane plastic.

9. The polyurethane plastic of claim 6 wherein a blowing agent is included to prepare a cellular polyurethane plastic and said organic compound containing active hydrogen containing groups is a polyhydric polyalkylene ether.

10. A polyether polyurethane prepared by a process which comprises reacting a polyhydric polyalkylene ether having a molecular weight of from about 200 to about 5,000 and an hydroxyl number of from about 25 to about 800 with a polyisocyanate prepared by a process which comprises reacting a mixture of different polyaryl polyalkylene polyisocyanates having the formula

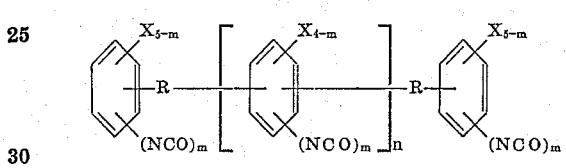

wherein $m$ is 1 to 3, $n$ is from about 0.5 to about 2.0, X is selected from the group consisting of hydrogen, lower alkyl, lower alkoxy and halogen and R is an alkylene radical having from 1 to 6 carbon atoms, with sufficient primary or secondary monohydric alcohol or monocarboxylic acid to react with from about 2 to about 50% of the —NCO groups of said mixture of polyaryl polyalkylene polyisocyanates.

11. A method of improving the compatibility of a mixture of different polyaryl polyalkylene polyisocyanates having the formula

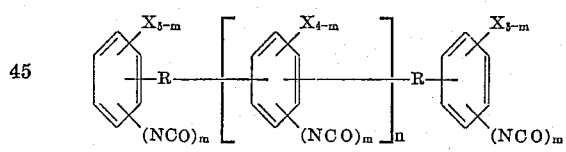

wherein $m$ is 1 to 3, $n$ is from about 0.5 to about 2.0, X is selected from the group consisting of hydrogen, lower alkyl, lower alkoxy, and halogen and R is an alkylene radical having from 1 to 6 carbon atoms, which comprises reacting said mixture of polyisocyanate with a primary or secondary monohydric alcohol or a monocarboxylic acid in an amount sufficient to react with from about 2 to about 50% of the —NCO groups of said mixture of polyaryl polyalkylene polyisocyanate.

12. The method of claim 10 wherein 5 to 30% of the —NCO groups of said polyaryl polyalkylene polyisocyanate are prereacted with said primary or secondary monohydric alcohol or monocarboxylic acid.

References Cited by the Examiner

UNITED STATES PATENTS

| | | | |
|---|---|---|---|
| 2,683,728 | 8/1954 | Mastin | 260—77.5 X |
| 3,012,008 | 12/1961 | Lester | 260—471 X |
| 3,105,845 | 10/1963 | Fetterly et al. | 260—471 X |

FOREIGN PATENTS 665,495    6/1963    Canada.

LEON J. BERCOVITZ, *Primary Examiner.*

DONALD E. CZAJA, *Examiner.*